(12) United States Patent
Wa

(10) Patent No.: US 7,073,913 B1
(45) Date of Patent: Jul. 11, 2006

(54) PORTABLE EASEL FOR ASSISTING IN TRACING AND DRAWING OF FIGURES

(75) Inventor: Choi Man Wa, Hong Kong (CN)

(73) Assignee: Battat Incorporated, Plattsburgh, NY (US)

( * ) Notice: Subject to any disclaimer, the term of this patent is extended or adjusted under 35 U.S.C. 154(b) by 75 days.

(21) Appl. No.: 10/681,939

(22) Filed: Oct. 8, 2003

(51) Int. Cl.
*G03B 21/10* (2006.01)
*G09B 11/06* (2006.01)

(52) U.S. Cl. .................. 353/74; 353/62; 353/26 R; 434/88; 434/85

(58) Field of Classification Search .............. 353/62, 353/26 R, 28, 29, 35, 74, 75, 79, 80, DIG. 5, 353/11–14; 349/6, 7, 58, 12; 348/14.03, 348/14.07, 112; 362/33, 89, 90, 125, 253, 362/365, 364, 367–371; 463/48; 434/81, 434/85–92, 324, 331–333; G09B 11/06
See application file for complete search history.

(56) References Cited

U.S. PATENT DOCUMENTS

| | | | | |
|---|---|---|---|---|
| 1,992,776 A | * | 2/1935 | Schindler | 353/43 |
| 2,311,056 A | * | 2/1943 | Langberg | 353/99 |
| 3,801,199 A | * | 4/1974 | Kaye | 353/74 |
| 3,887,275 A | * | 6/1975 | Heist | 353/74 |
| 4,170,408 A | * | 10/1979 | Behr | 353/72 |
| 4,524,521 A | * | 6/1985 | Kolb | 33/1 AA |
| 5,100,325 A | * | 3/1992 | Cutler | 434/91 |
| 5,217,293 A | * | 6/1993 | Kobzeff | 362/97 |
| 5,284,445 A | * | 2/1994 | Dietterich et al. | 434/419 |
| 5,506,640 A | * | 4/1996 | Orlich | 353/28 |
| 5,748,183 A | * | 5/1998 | Yoshimura et al. | 345/173 |

* cited by examiner

*Primary Examiner*—W. B. Perkey
*Assistant Examiner*—Andrew Sever
(74) *Attorney, Agent, or Firm*—Levisohn, Berger & Langsam, LLP

(57) ABSTRACT

A portable, lightweight easel for assisting in the tracing of figures is provided. The base has an interior volume with a projector and ancillary art supplies disposed therein. The projector has a light source and a receptacle for receiving a light-transmissible medium having at least one image formed thereon. A writing plane is attached to the main base and angled above the interior volume. It was an upper surface and a lower surface. The writing plane includes a translucent window-like portion between its upper and lower surfaces. The projector shines light through the medium and projects the image through the window and onto the lower surface of the writing plane so that the image is visible on the upper surface of the writing plane. Multiple images may be provided on a single medium, and the easel may be provided with multiple media each bearing different images.

39 Claims, 10 Drawing Sheets

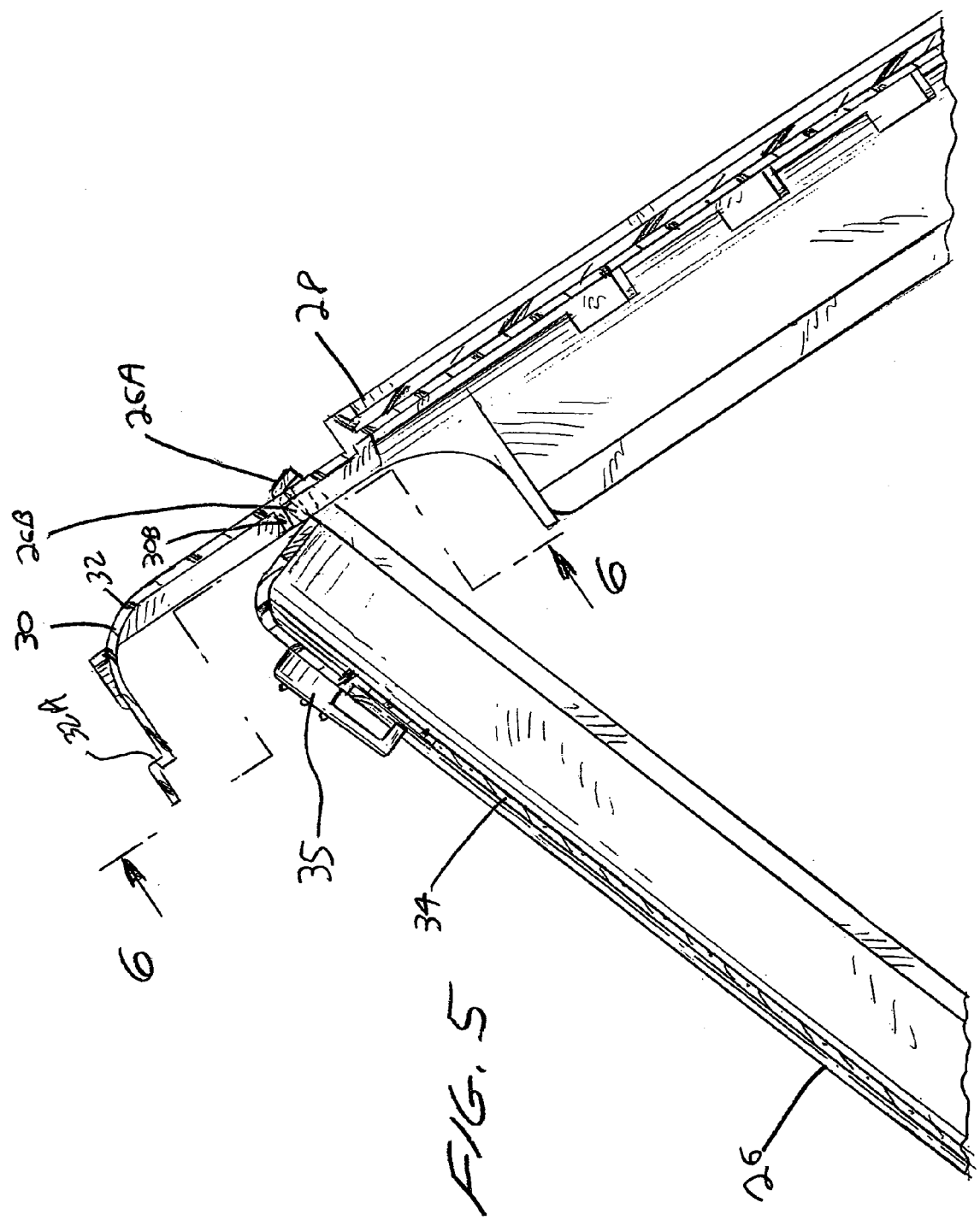

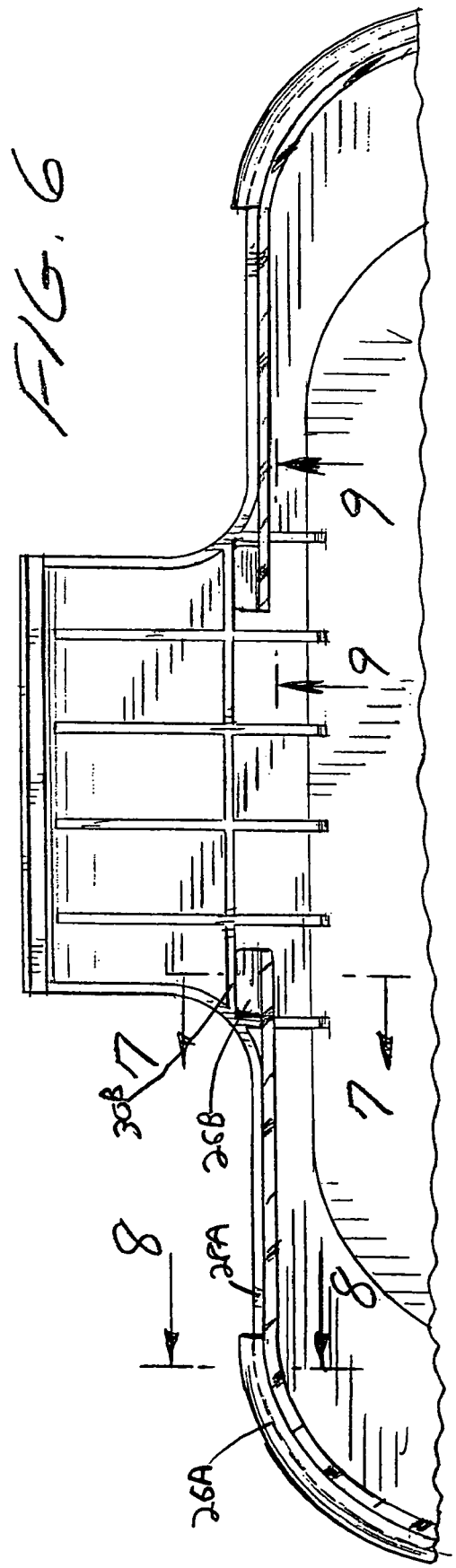
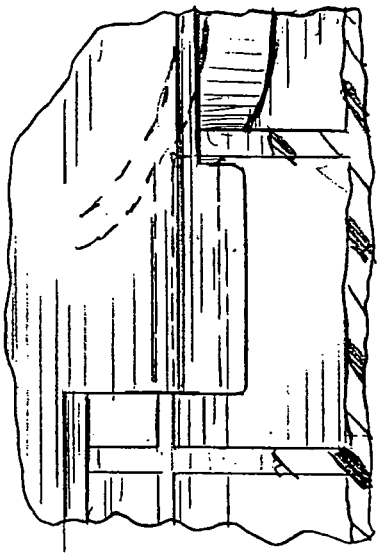
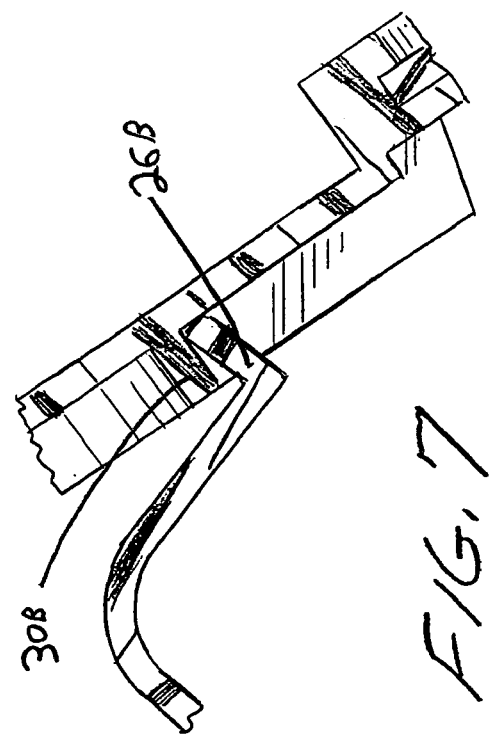

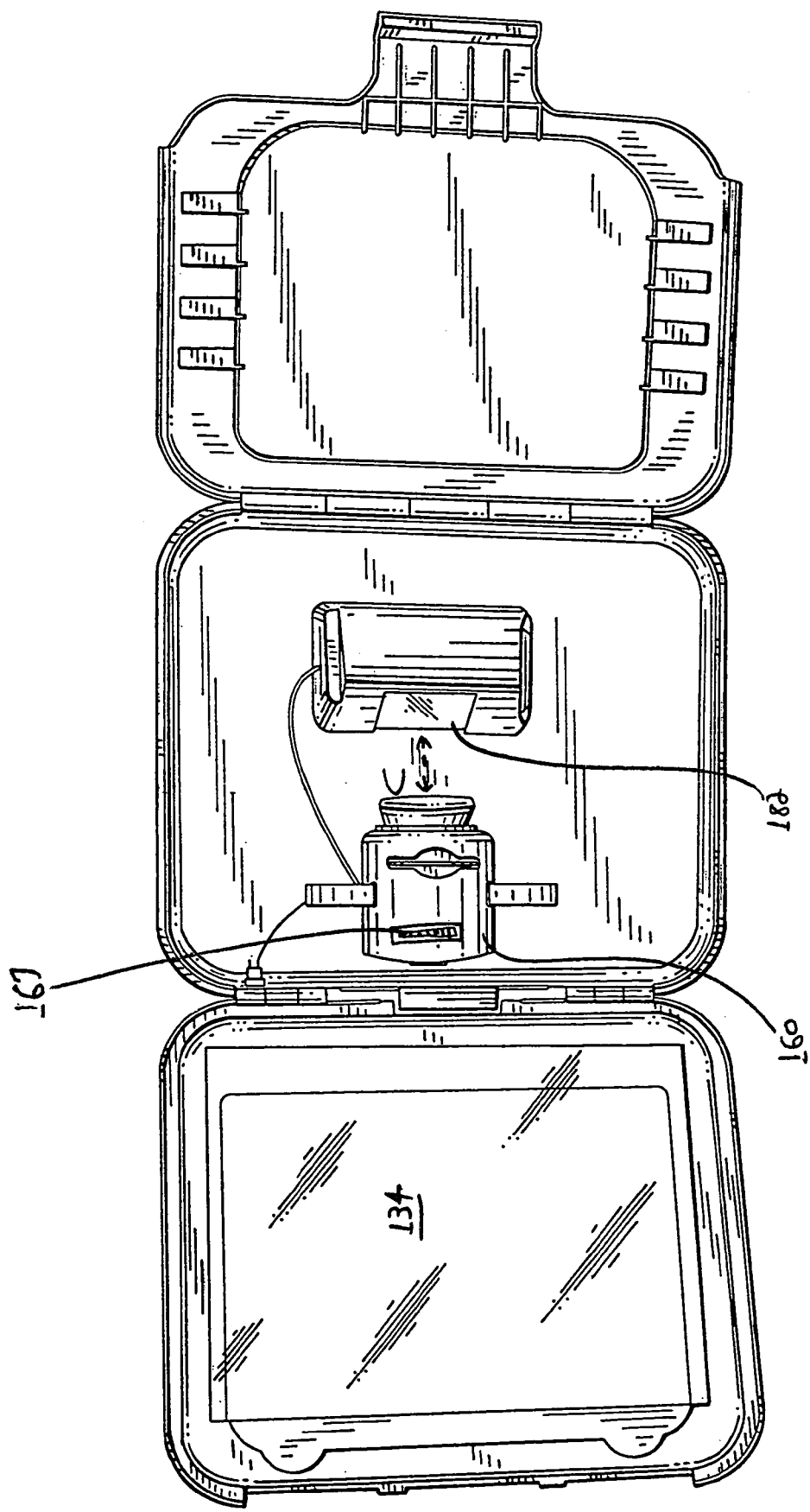

PORTABLE EASEL FOR ASSISTING IN TRACING AND DRAWING OF FIGURES

BACKGROUND OF THE INVENTION

1. Field of the Invention

The invention relates to children's drawing toys and aides, and more specifically to toys and devices that assist children in tracing and drawing images.

2. Description of the Related Art

Children enjoy drawing pictures of familiar items and perhaps coloring them in afterward. However, drawing a picture as you want it to look involves motor skills, spatial relations, and an artistic sensibility that elude most people, be they children or adults. Freehand drawing can be extremely frustrating, as poor drawings serve as a disincentive for many people to continue to draw. The use of stencils provides accuracy in reproducing figures, but stencils are often limited to letters and numbers and do not afford the user any sense of originality.

One common way a person can accurately reproduce an image is by tracing the image on tracing paper. Tracing paper is more light-transmissible than ordinary paper, so that the placement of a sheet of tracing paper atop an image allows the image to be seen through the tracing paper. The would-be artist merely goes over the lines of the original image with a pen, pencil, or marker on the tracing paper.

There are limitations to this method. First, tracing paper is typically of lower quality than ordinary paper. By merely seeing the tracing paper as the substrate for the drawn image, one readily knows the image was traced. Tracing paper is also typically less durable than regular paper; indeed, when tracing paper is folded, the crease where it was folded leaves a visible mark. Tracing also forces the tracer to create an image that is the same size as the original. It is therefore difficult to change the size of the image being traced. What one is left with when one traces an image is an overly small or large image on poor quality paper that everyone instantly knows was not drawn from scratch.

SUMMARY OF THE INVENTION

Accordingly, it is an object of the invention to provide a device that allows children (or adults) to reproduce a desired image onto ordinary paper.

It is another object of the invention to provide a device that allows children (or adults) to reproduce a desired image or multiple images of varying size onto ordinary paper.

It is another object of the invention to provide a device that encourages children (or adults) to draw.

The above and other objects are fulfilled by the invention, which is a portable easel for assisting in the tracing of figures. The invention has a main base having an interior volume, and a projector is disposed in the interior volume. The projector has a light source and a receptacle adapted to receive a light-transmissible medium bearing an image. A writing plane is attached to the main base above the interior volume having an upper surface and a lower surface and including a light-transmissible portion. The projector shines light through the medium in a path of light and projects the image onto the lower surface of the writing plane so that the image is visible on the upper surface of the writing plane. Because the image has a light source underneath it, the image is visible through most grades of paper. The user can then trace the image onto ordinary paper instead of onto tracing paper. If desired, the user can color the traced image as well.

The writing plane is preferably hingedly attached to the main base at one end of the main base, and a cover is preferably hingedly attached to an opposite end of the main base. The writing plane can be propped against the cover at an angle to the main base. More specifically, the writing plane is preferably movable about its hinged attachment between an upright position at an angle with the main base of between 0° and 90° and a flat position substantially parallel and enclosing the main base. The writing plane is maintainable in the upright position by propping the writing plane against the cover. The cover is lockably closable over the writing plane when the writing plane is in the flat position. The cover may be provided with a supplemental writing surface (a magnetic or white board, or simply another flat panel) on an upper surface of the cover. Clips are preferably attached to the upper surface of the writing plane adjacent the translucent portion for securing a piece of paper on top of the translucent portion. The base can be used as a carrying case for colored markers, pencils, paper, etc.

The projector preferably includes a mirror disposed in the path of light produced by the light source. Light from the light source passes through the receptacle for the original image, is reflected off of the mirror, and is projected onto the lower surface of the writing plane. The mirror is angled with respect to the path of light so as to reflect the light onto the lower surface of the writing plane when the writing plane is in the upright position. In one embodiment, the distance between the projector and the mirror is adjustable; at least one of the projector and the mirror may be movable with respect to the other. This allows the user to adjust the size of the image projected on to the writing plane.

The projector preferably includes a projector housing with a receptacle or slot formed in the projector housing for receiving the image medium. Alternatively, the medium may be placed in a clip or clips disposed in the light path. In either event, the image-bearing medium preferably has a round frame having a plurality of images formed around the periphery of the frame. When the medium is placed in the receptacle, one of the plurality of images is rotatably alignable with the path of light. The frame preferably has registration notches formed in an outer periphery of the frame, and the receptacle preferably includes a registration projection; when the medium is rotated within the receptacle, the registration projection engages one of the registration notches to align one of the images with the path of light. In the preferred embodiment, a plurality of media are sold or provided with the device, each bearing different images or different sets of images.

BRIEF DESCRIPTION OF THE DRAWINGS

FIG. 5 is an enlarged, partial sectional view of the portable easel of FIG. 1 taken along line 5—5 of FIG. 4.

FIG. 6 is an enlarged, partial sectional view of the portable easel of FIG. 1 taken along line 6—6 of FIG. 5.

FIG. 7 is an enlarged, partial sectional view of the portable easel of FIG. 1 taken along line 7—7 of FIG. 6.

FIG. 8 is an enlarged, partial sectional view of the portable easel of FIG. 1 taken along line 8—8 of FIG. 6.

FIG. 9 is an enlarged, partial sectional view of the portable easel of FIG. 1 taken along line 9—9 of FIG. 6.

FIG. 12 is a top elevation view of an alternate embodiment of a portable easel according to the invention with movable projector assembly.

DETAILED DESCRIPTION OF THE PREFERRED EMBODIMENTS AND THE DRAWINGS

Description of the invention will now be given with reference to the attached FIGS. 1–13C. It should be noted that these drawings are exemplary in nature and in no way serve to limit the scope of the invention, which is defined by the claims appearing hereinbelow.

Figure 1:
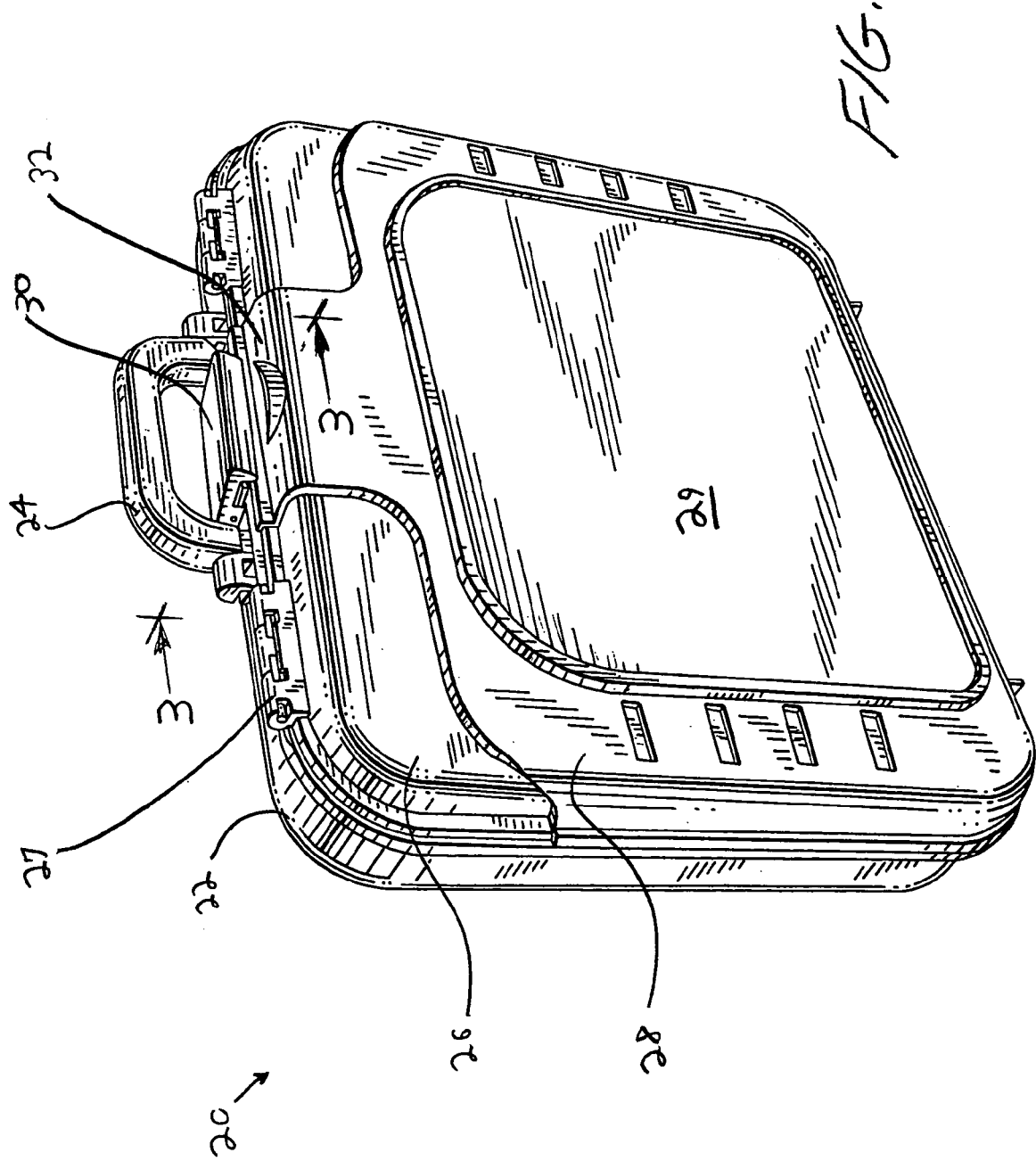
FIG. 1 is a perspective view of a portable, lightweight, easel in accordance with the invention.
Figure 2:
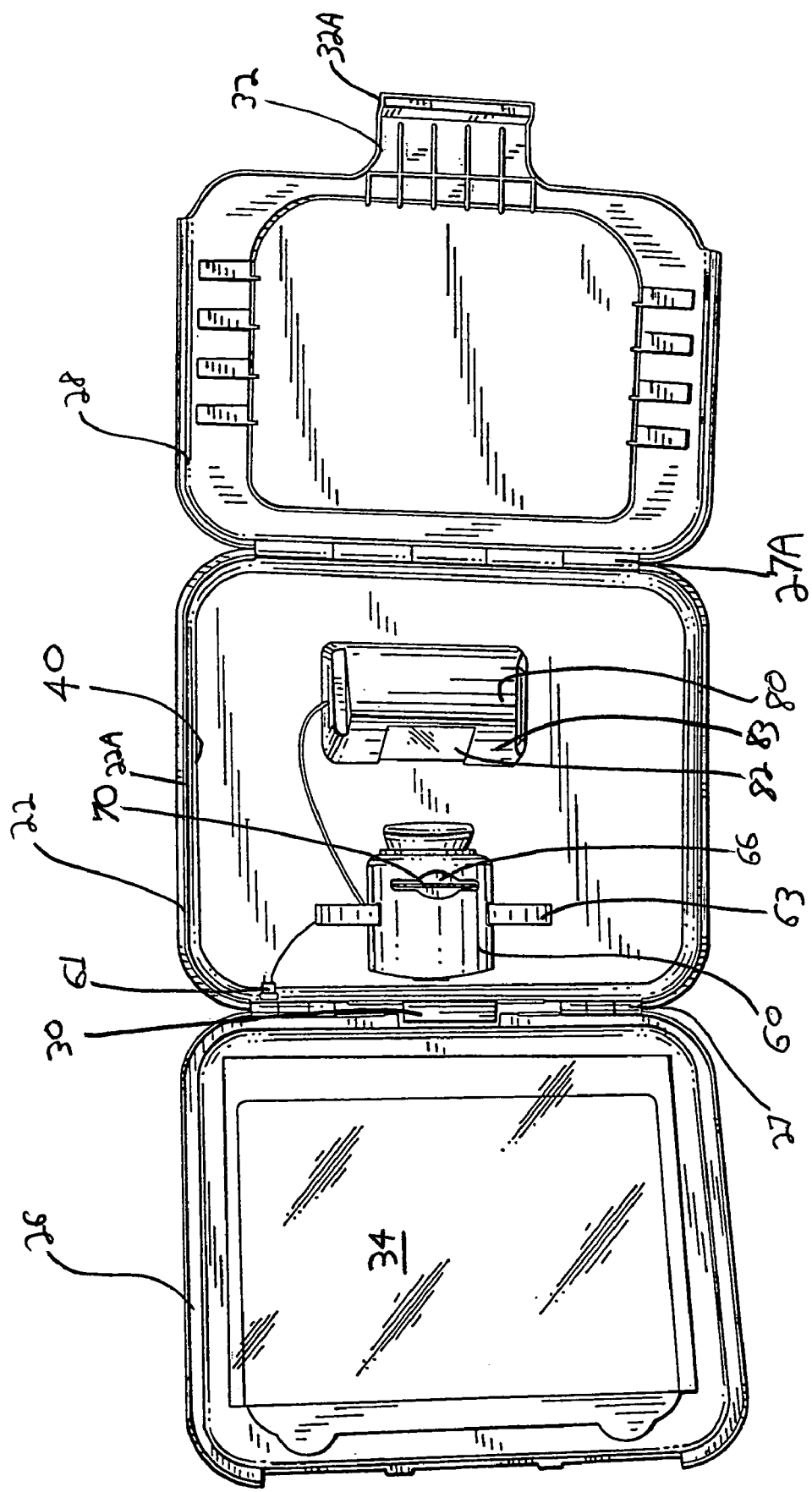
FIG. 2 is a top elevation view of the portable easel of FIG. 1 with the writing plane and cover open to expose the interior of the base.

Referring first to FIGS. 1 and 2, the invention is a portable, (lightweight for a child) easel 20 which facilitates the tracing (or similar methods at re-creation) of an image onto a piece of paper. Easel 20 includes a main base 22 from which extends handle 24. Writing plane 26 is hingedly attached to main base 22 via hinges 27 on one side of the base, and cover 28 is hingedly attached to main base 22 via interleaved hinge 27A on the other side. The top of cover 28 is optionally provided with a supplemental writing surface 29. This can be a magnetic or white board. It can also serve as a flat surface for drawing and/or display of drawings. Disposed between hinges 27 and attached to main base 22 is a spring-biased catch 30, which secures onto rim 32A (See FIG. 5) of projection 32 of cover 28. When cover 28 is folded over main base 22, catch 30 locks onto rim 32A to keep the cover closed. With the cover closed, easel 20 resembles a small suitcase and can be transported from one place to another very easily. When the invention is desired to be used, catch 30 is pulled back (against the force of a spring) in the direction of arrow A (see FIG. 3), and cover 28 is hingedly lifted off of writing plane 26 in the direction of arrow B (also in FIG. 3). Writing plane 26 includes a solid window 34 which is made of light-transmissible material (preferably light-translucent plastic). Window 34 need not be fully transparent; in fact, it is preferred that it be translucent for reasons that will be explained below.

Figure 3:
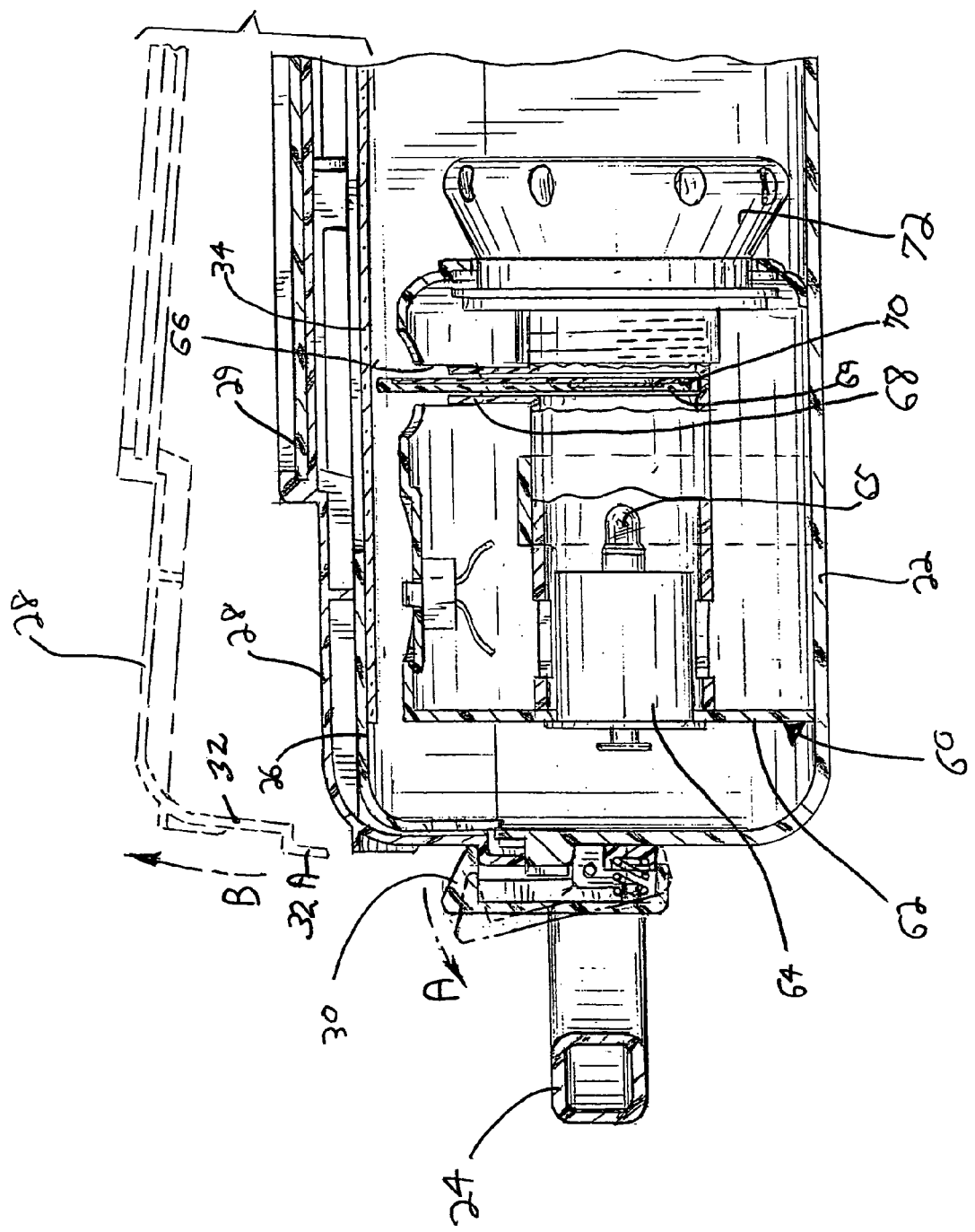
FIG. 3 is an enlarged, partial sectional view of the portable easel of FIG. 1 taken along line 3—3 of FIG. 1.

The inside of main base 22 defines an interior volume 40 in which is disposed projector assembly 60 (see FIGS. 2 and 3). Writing implements and paper can also be stored in the main base. Projector assembly 60 takes an image formed on a medium such as a photographic-like slide 70 and projects it onto the underside of window 34 of writing plane 26. On/off button 61 projects through base 22 and controls the electrical/light operation of the projector. In the embodiment shown, projector housing 62 is secured to base 22 by straps 63. This allows ease of bulb and lens replacement. Inside projector housing 63, lamp assembly 64 is removably disposed so that bulb 65 may be replaced when it burns out. Projector housing 62 also includes a slot or receptacle 66 which may preferably include finger grips 68. Image-bearing medium or slide 70 is insertable into receptacle 66 and held securely by finger grips 68. Threaded and rotatable lens 72 is provided on the front side of receptacle 66 for focusing an image produced when light from bulb 65 shines through slide 70, held in receptacle 66. Batteries and suitable wiring connecting the power source to the on/off button is provided.

In the most general embodiment, an image formed from light passing through slide 70 and lens 72 could be directly projected onto the underside of window 34; however, the image would be reversed as seen on the front of window 34. The slide 70 could be inserted into receptacle 66 in reverse, however the direct projection of the image onto window 34 would either yield a small image or require a large base (to allow the path of light enough distance for the image to spread out sufficiently). Therefore, to reverse the image, and also to make the housing substantially more compact, a mirror is provided in interior volume 40.

By causing the light that passes through slide 70 to be reflected off of mirror 82, the path of the light is greatly increased while the size of the base is kept small. Since the size of the image increases proportionally with the length of the light path, a much larger image is projected onto window 34 than would be possible by direct projection. Put another way, the base 22 may be much more compact and still contain a projection assembly capable of enlarging the image on a small slide to page size (e.g., 8½"×11"). In the preferred embodiment, a bulkhead 80 is provided with mirror 82 disposed on an angled surface 83 thereof.

The angle of angled surface 83 (and thus mirror 82) should be substantially equal to that made by writing plane 26 when in use (see FIGS. 4 and 10 and explanation below); that is, writing plane 26 and mirror 82 should be substantially parallel. If they are not parallel, the image projected onto the writing plane will be distorted as different portions of the projected image will have different light travel distances and thus be different sizes. The specific angle in question is not critical but should be in the range of about 45°–75°. The invention is not limited to the use of one mirror; any number of mirrors may be used as would be convenient. It is preferred that, in an embodiment employing multiple mirrors, the mirror closest to the writing plane) in terms of the light path) be substantially parallel to the writing plane.

Bulkhead 80 also includes the battery compartment (not shown) for the device. It is preferred that the invention be battery operated to make it as portable as possible. However, it is also contemplated as being within the scope of the invention to provide an embodiment which can be plugged into a conventional alternating current socket.

Main base 22 is preferably compact in nature, but it must be large enough to contain projector assembly 60. In a preferred embodiment, main base 22 may also serve to contain the various writing implements (not shown) and supplies to be used by the would-be artist, e.g., pencils, markers, chalk, crayons, paper and the like. It also provides storage for one or more image-bearing slides 70.

Figure 4:
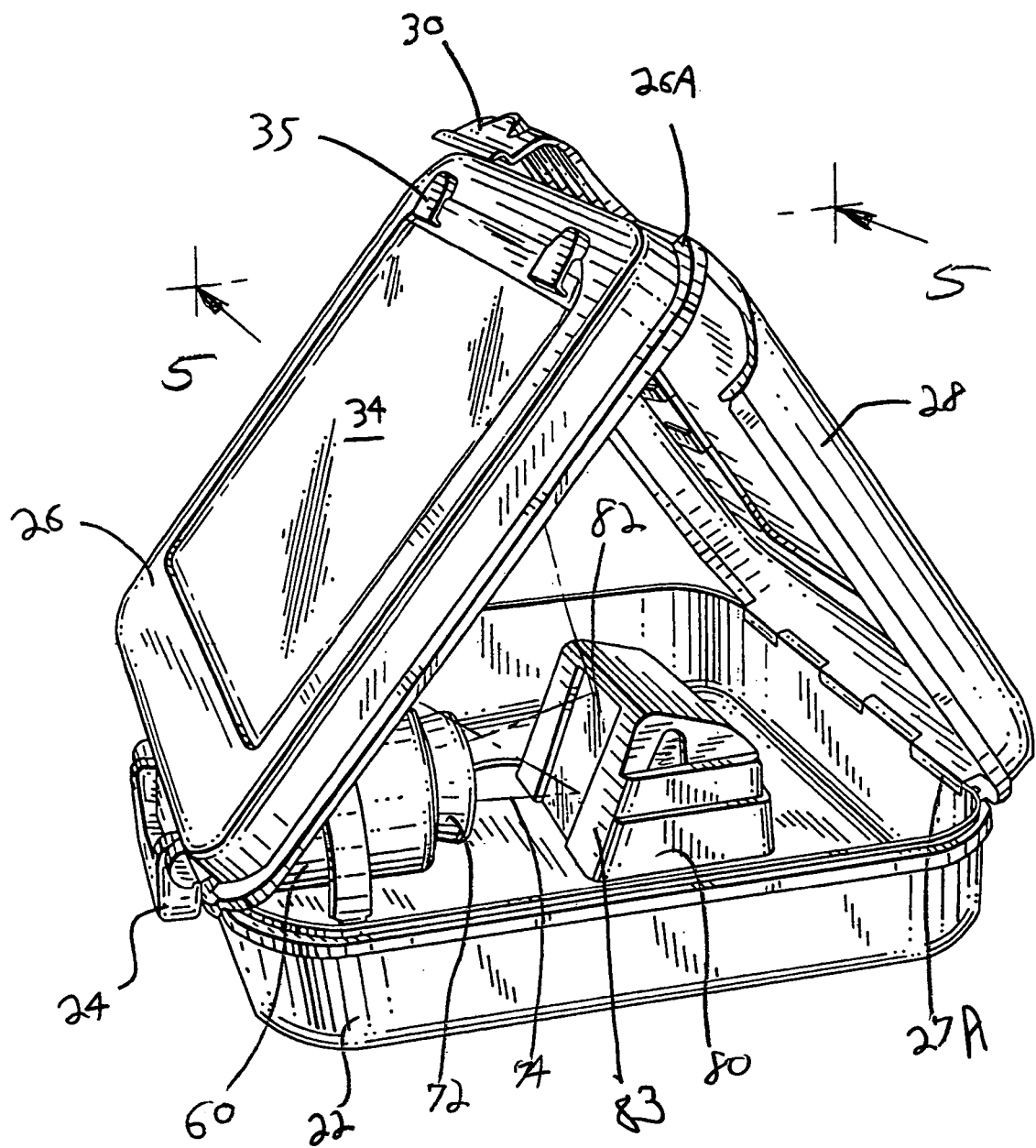
FIG. 4 is a perspective view of the portable easel of FIG. 1 with the writing plane and cover in an upright configuration.
Figure 10:
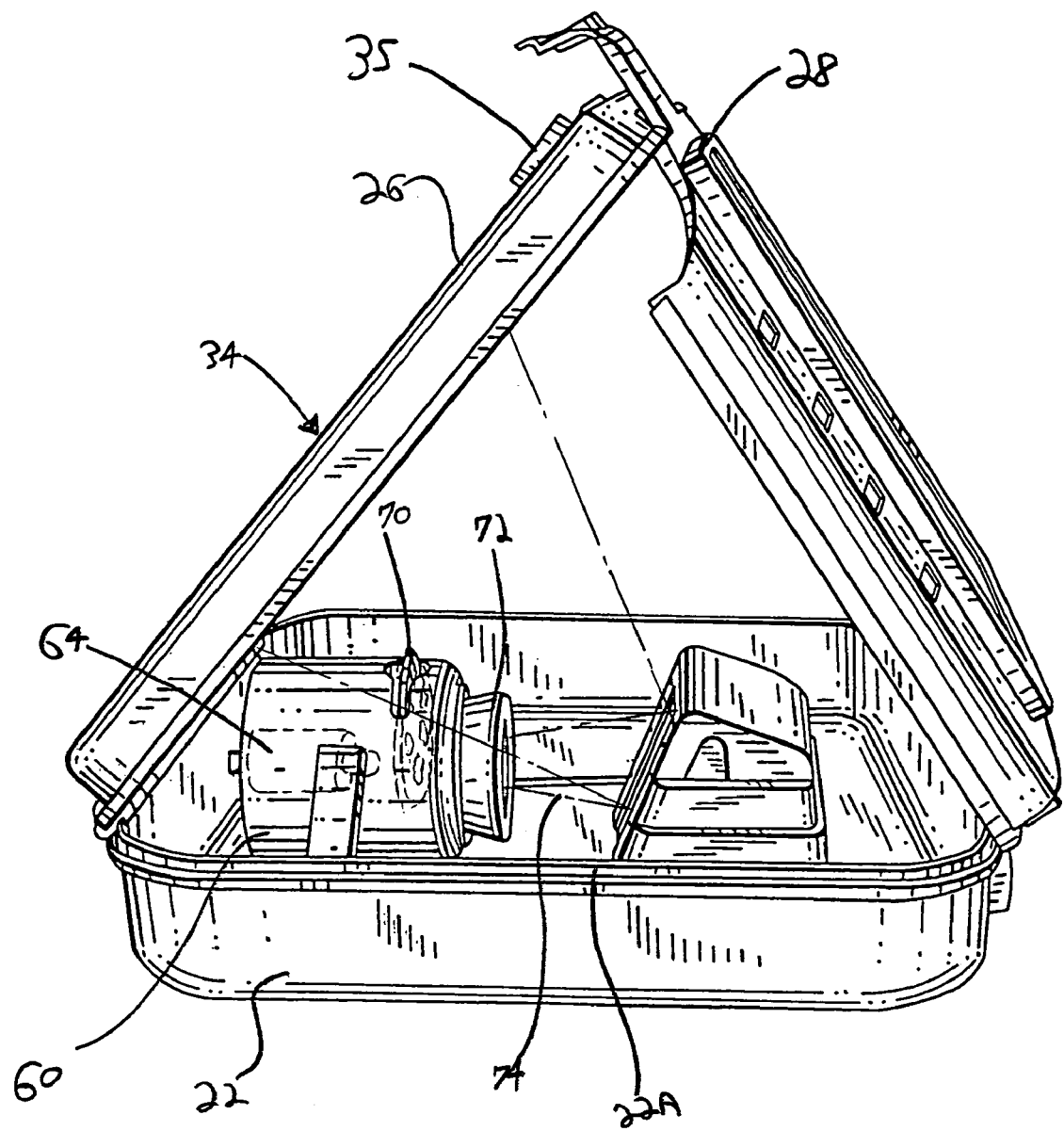
FIG. 10 is a side perspective view of the portable easel of FIG. 1 with the writing plane and cover in an upright configuration illustrating the device in use.

The invention is shown in operation in FIGS. 4 and 10. Writing plane 26 is propped against cover 28 (in a manner to be described below) so that both cover 28 and writing plane 26 are angled with respect to base 22. A piece of paper (not shown) is secured atop writing plane 26 by clips 35, which are disposed adjacent window 34. An image-bearing slide 70 is placed in receptacle 66 and held there by finger grips 68. Button 61 (See FIG. 2) is depressed to connect the electrical power to the bulb of the projector. Bulb 65 shines light through slide 70, the path 74 of the light strikes mirror 82 and is reflected upwards onto the underside of window 34. Because window 34 is light-transmissible, the image on slide 70 will be visible from the top or upper side of window 34. Moreover, the image will be visible even though a piece of paper is secured atop writing plane 26, unless the paper is extremely thick (e.g., oaktag, cardboard, or the like). The user can then trace the image onto the paper and/or color or otherwise change the image as desired.

FIGS. 5–9 depict how the invention is configured for use, i.e., how writing plane 26 is propped securely against cover 28. It is important that cover 28 be able to support not only writing plane 26 but the force of a person drawing upon a piece of paper secured to writing plane 26. Writing plane 26 includes at least one but preferably two flanges 26A disposed on its perimeter or edge. These are dimensioned to rest on rim 22A of main base 22 (see FIG. 10) when the device is closed, but they also are dimensioned to catch on rim 28A of cover 28 when the device is in its open configuration. For added stability, writing plane 26 is also provided with tabs 26B which engage internal rib 30B of catch 30. As shown best in FIGS. 5 and 6, flange 26A fits above rim 28A, and tabs 26B fit under internal rib 30B. With this structure, the more pressure that is brought to bear on writing plane 26 when it is propped against cover 28, the more securely writing plane 26 is held by cover 28 (within a reasonable limit, since most of the parts are preferably made of lightweight plastic).

Figure 11:
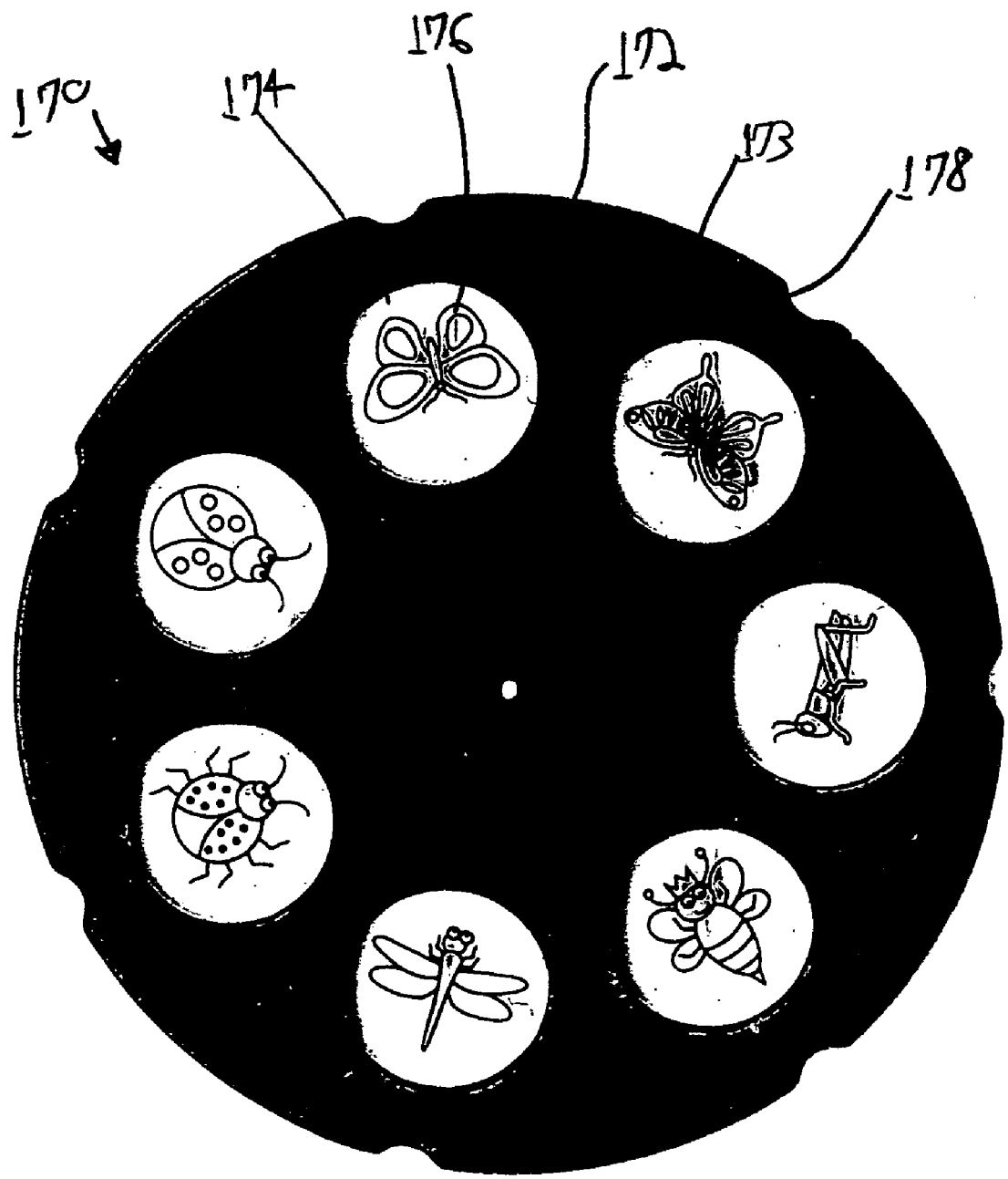
FIG. 11 is a schematic of a preferred image-bearing medium in accordance with the invention.

As mentioned before, an image-bearing medium or slide 70 is inserted into the projector housing (or, in the alternative, into one or more clips disposed in front of the projector) so that the image may be projected onto window 34. A preferred embodiment of one such medium is shown in FIG. 11. The inventive slide 170 includes a round disk-like (and preferably cardboard or plastic) frame 172 having a plurality of holes 173 formed around the periphery of the frame. A piece of transparent material 174 on which a line drawing, photograph or other image 176 is formed is located in each hole 173. When slide 170 is placed in the receptacle, one of the plurality of images is rotatably alignable with the path of light 74 of the projector. Frame 172 has registration notches 178 formed in its outer periphery. Receptacle 66 of projector housing 62 includes a registration projection 69 upon which slide 170 sits. When slide 170 is rotated within receptacle 66, the registration projection 69 engages one of the registration notches 178 to align one of the images 176 with the path of light 74. To change the image being projected onto window 34, all one need do is rotate slide 170 until another registration notch 178 engages projection 69, and another image 176 will be aligned with the light path 74 of the projector. It is further contemplated that the invention be provided with a plurality of the slides 170 each bearing different images. For example, one slide could have images of different insects, another could have images of spaceships, and the like. Alternatively, these slides could be sold separately and/or sold as collectible items.

One of the advantages of the invention is that it projects an image onto writing plane 26 which is substantially the same size as a piece of paper to be placed over it (e.g., 8½×11 inches, 11×17 inches, or the like). However, it may be desired to trace or color an image that is smaller or larger, in print, than the entirety of the page, or to trace or color multiple images on the same page. To wit, several embodiments are contemplated which allow for the modification in size (preferably reduction) of the image. The first is illustrated in FIG. 12. Projector 160 is provided with wheel 167 which is connected to a ball screw (not shown) or a similar element which translates rotational motion into linear motion of the projector. When wheel 167 is rotated, it causes the projector to move closer to or away from mirror 182 in the direction of arrows C. By shortening the distance between the projector and the mirror, the user shortens the overall light path and thereby reduces the size of the image when it strikes window 134 (the longer the light path, the more the light spreads out, and thus the larger the image). One can also project a portion of an image that is larger than the size of the paper and still leaves room for other images by rotating wheel 167 to increase the length of the light path.

Figure 13A:
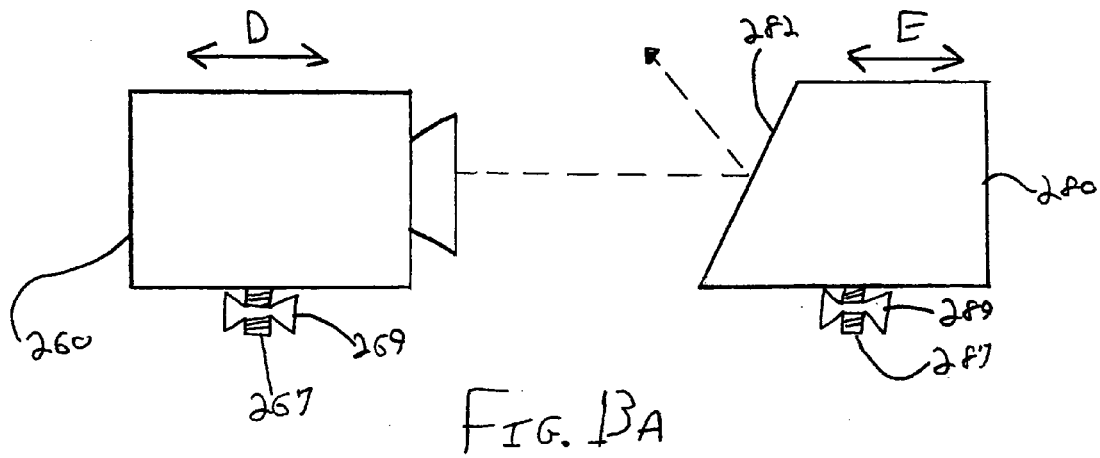
FIG. 13A is a side schematic of another alternate embodiment of a portable easel according to the invention with movable projector assembly.
Figure 13B:
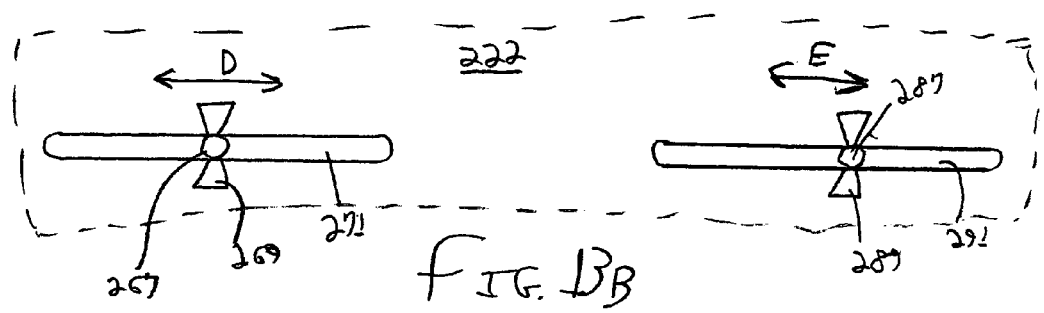
FIG. 13B is a bottom schematic of the embodiment of a portable easel according to the invention with movable projector assembly of FIG. 13B.

A similar embodiment is shown in FIGS. 13A–B. In this embodiment, the projector and the mirror are movable along guide grooves. Projector 260 is provided with a bolt 267 upon which a wing nut 269 or a similar securing means is placed. Bolt 267 is seated in guide groove 271 formed through the bottom of main base 222 of the invention. The wing nut can be located on the outside of the main base 22. Tightening wing nut 269 secures projector 260 to the main base, and loosening wing nut 269 enables the user to reposition projector 260 along guide groove 271 in the direction of arrow D. Similarly, bulkhead 280 may be provided with bolt 287 and wing nut 289 and be movable along guide groove 291 in the direction of arrow E. The purpose of enabling the relative movement and repositioning of these elements, as before, is to vary the length of the light path so as to vary the size of the image projected onto the window. As an alternative, the guide grooves 271 and 291 depicted in FIG. 13B could be trackways wholly contained within the main base or similar structure.

Figure 13C:
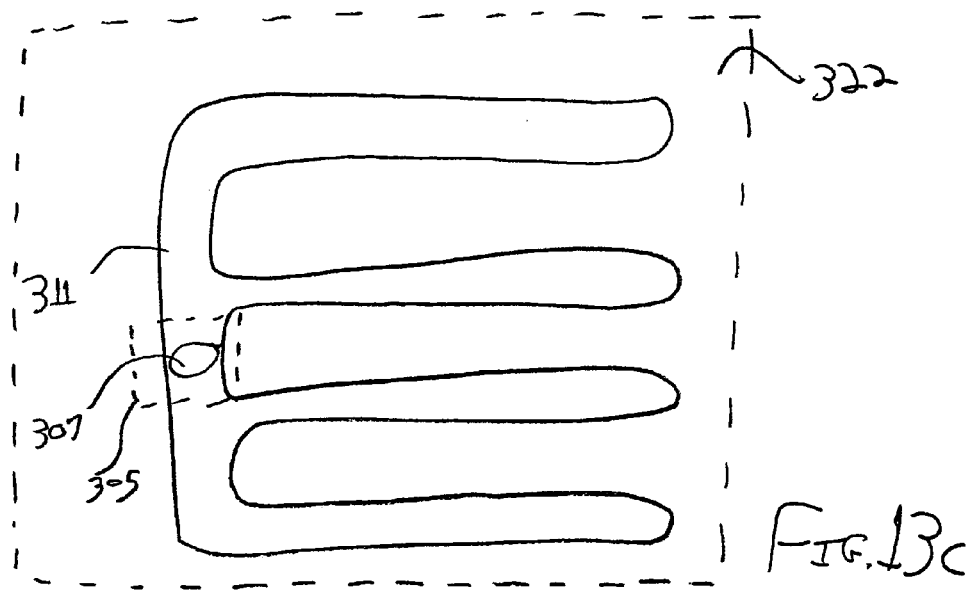
FIG. 13C is a bottom schematic of yet another alternate embodiment of a portable easel according to the invention with movable projector assembly.

Another variation contemplated is depicted in FIG. 13C. In this embodiment, the projector and mirror are movable with respect to each other as above and are mounted on a common platform 305. The bottom of platform 305 is provided with a threaded bolt 307 which is slidable within track 311. Track 311 is not merely linear but covers most of the bottom of base 322. The result is not only that the image can be reduced in size but it can also be positioned to be shown on a specific portion of the window of the writing plane. In this manner, the user could trace or color several different images on the same page, one after the other, without having to move the paper from the clips.

Having described the invention with regard to specific embodiments, it is to be understood that the above description is not meant as a limitation excluding such further variations or modifications as may be apparent or may suggest themselves to those skilled in the art. The invention is defined by the claims appearing hereinbelow.

I claim:

1. A portable easel for assisting in the tracing of a figure onto a sheet of tracing paper, comprising:
   a main carrying case defining an interior volume;
   a projector disposed in said interior volume, said projector having a light source and an image holding means aligned with said light source and adapted to receive a light-transmissible medium bearing an image; and
   a writing plane attached to said main carrying case above said interior volume having an upper surface and a lower surface, said writing plane including a light-transmissible portion between said upper surface and said lower surface,
wherein said projector shines a path of light through the medium which projects the image onto said lower surface of said writing plane so that the image is visible on said upper surface of said writing plane, said writing plane having holding means securing the sheet of tracing paper.

2. A portable easel according to claim 1, wherein said writing plane is hingedly attached to said main base at one end of said main base.

3. A portable easel according to claim 2, further comprising a cover hingedly attached to an opposite end of said main base as said writing plane.

4. A portable easel according to claim 3, wherein said writing plane is adapted to be secured against said cover at an angle to said main base.

5. A portable easel according to claim 3, wherein said writing plane is movable about its hinged attachment between an upright position at an angle with said main base of between 0° and
 90° and a flat position substantially parallel with and covering said main base.

6. A portable easel according to claim 5, wherein said writing plane is maintainable in said upright position by securing said writing plane against said cover.

7. A portable easel according to claim 5, wherein said cover is lockably closable over said writing plane when said writing plane is in said flat position.

8. A portable easel according to claim 5, said projector further comprising a mirror disposed in said path of light produced by said light source, wherein light from said light source passes through said image holding means, is reflected off of said mirror, and is projected onto said lower surface of said writing plane.

9. A portable easel according to claim 8, wherein said mirror is angled with respect to said path of light so as to reflect said light onto said lower surface of said writing plane when said writing plane is in said upright position.

10. A portable easel according to claim 8, wherein said projector includes a projector housing and said image holding means comprises a slot formed in said projector housing between said light source and said mirror.

11. A portable easel according to claim 3, further comprising a supplemental writing surface on said cover.

12. A portable easel according to claim 1, further comprising clips attached to said upper surface of said writing plane to secure a piece of paper on top of said writing plane.

13. A portable easel according to claim 1, wherein said projector further comprises at least one mirror in said interior volume to reflect light from said light source and direct the same onto said lower surface of said writing plane.

14. A portable easel according to claim 1, wherein said projector includes a projector housing and said image holding means comprises a slot formed in said projector housing.

15. A portable easel according to claim 1, wherein said image holding means comprises grips for securing said light-transmissible medium.

16. A portable easel for assisting in the tracing of a figure onto a sheet of tracing paper, comprising:
 a main base having an interior volume;
 a projector disposed in said interior volume, said projector having a light source and an aligned receptacle for holding a light transmissible medium;
 the light-transmissible medium having at least one image formed thereon insertable into said receptacle;
 a writing plane attached to said main base and locatable above said interior volume having an upper surface and a lower surface, said writing plane including a translucent window portion and having a holding means to secure sheet of tracing paper,
 wherein said light source shines light through said light-transmissible medium and projects said image onto said lower surface of said writing plane said image is visible on said upper surface of said writing plane and on the surface of said tracing paper.

17. A portable easel according to claim 16, wherein said writing plane is hingedly attached to said main base at one end of said main base.

18. A portable easel according to claim 17, further comprising a cover hingedly attached to an opposite end of said main base.

19. A portable easel according to claim 18, wherein said writing plane is adapted to be propped open against said cover at an angle to said main base.

20. A portable easel according to claim 18, wherein said writing plane is movable about its hinged attachment between an upright position at an angle with said main base of between 0° and 90° and a flat position substantially enclosing said main base.

21. A portable easel according to claim 20, wherein said writing plane is maintainable in said upright position by propping said writing plane against said cover.

22. A portable easel according to claim 20, wherein said cover is securely closable over said writing plane when said writing plane is in said flat position.

23. A portable easel according to claim 20, said projector further comprising a mirror disposed in said path of light produced by said light source, wherein light from said light source passes through said receptacle, is reflected off of said mirror, and is projected onto said lower surface of said writing plane.

24. A portable easel according to claim 23, wherein said mirror is angled with respect to said path of light so as to reflect said light onto said lower surface of said writing plane when said writing plane is in said upright position.

25. A portable easel according to claim 23, wherein said projector includes a projector housing and said receptacle is a slot formed in said projector housing between said light source and said mirror.

26. A portable easel according to claim 18, further comprising a supplemental writing surface on an upper surface of said cover.

27. A portable easel according to claim 16, wherein said holding means comprises clips attached adjacent to said upper surface of said writing plane adapted to secure the sheet of tracing paper to the upper surface of said writing plane.

28. A portable easel according to claim 16, said projector further comprising a mirror disposed in said path of light produced by said light source, wherein light from said light source passes through said receptacle, is reflected off of said mirror, and is projected onto said lower surface of said writing plane.

29. A portable easel according to claim 16, wherein said projector includes a projector housing and said receptacle is a slot formed in said projector housing.

30. A portable easel according to claim 16, wherein said receptacle comprises grips for holding said light-transmissible medium.

31. A portable easel according to claim 16, said light-transmissible medium comprising a plurality of images each individually and selectively disposable in said path of light when said light-transmissible medium is placed in said receptacle.

32. A portable easel according to claim 16, said light-transmissible medium comprising a round frame having a plurality of images formed around the periphery of said frame, wherein when said light-transmissible medium is placed in said receptacle, each of said plurality of images is individually and selectively rotatably alignable into said path of light.

33. A portable easel according to claim 32, said frame having registration notches formed in an outer periphery of said frame, said receptacle including a registration projection, wherein when said light-transmissible medium is rotated within said receptacle, said registration projection engages one of said registration notches to align one of said images with said path of light.

34. A portable easel according to claim 16, further comprising a plurality of said light-transmissible media disposable in said receptacle, said plurality of light-transmissible media bearing different images.

35. A portable easel according to claim 16, wherein said main base is dimensional to contain drawing supplies.

36. A portable easel for assisting in the tracing of a figure onto a sheet of tracing paper, comprising:
- a main carrying case having an interior volume;
- a projector linearly movably disposed in said interior volume, said projector having a light source and a receptacle adapted to secure a light-transmissible medium bearing an image in alignment with said light source;
- a writing plane, attached to said main base, located at an angle to said interior volume, said writing plane having an upper surface and a lower surface, said writing plane including a light-transmissible portion between at least a portion of said upper surface and said lower surface, said writing plane having tracing paper holding means; and
- a mirror disposed in a path of light produced by said light source,
- wherein light from said light source passes through said image held said receptacle, is reflected off of said mirror, and is projected through said light transmissible portion so that the image is visible on a sheet of tracing paper held on said upper surface of said writing plane.

37. A portable easel according to claim 36, wherein said projector is selectively movable in a linear path towards and away from said mirror.

38. A portable easel according to claim 36, wherein the distance between said projector and said mirror is adjustable.

39. A portable easel according to claim 36, wherein at least one of said projector and said mirror are movable with respect to the other of said projector and said mirror.

* * * * *